Dec. 22, 1964 W. R. MITCHELL 3,162,369
HYDRAULIC SYSTEM OF SPRAY GUN CARRIAGE CONTROL
Filed June 11, 1963 5 Sheets-Sheet 1

INVENTOR
WAYNE R. MITCHELL
BY KARL W. FLOCKS
ATTORNEY

Dec. 22, 1964   W. R. MITCHELL   3,162,369
HYDRAULIC SYSTEM OF SPRAY GUN CARRIAGE CONTROL
Filed June 11, 1963   5 Sheets-Sheet 2
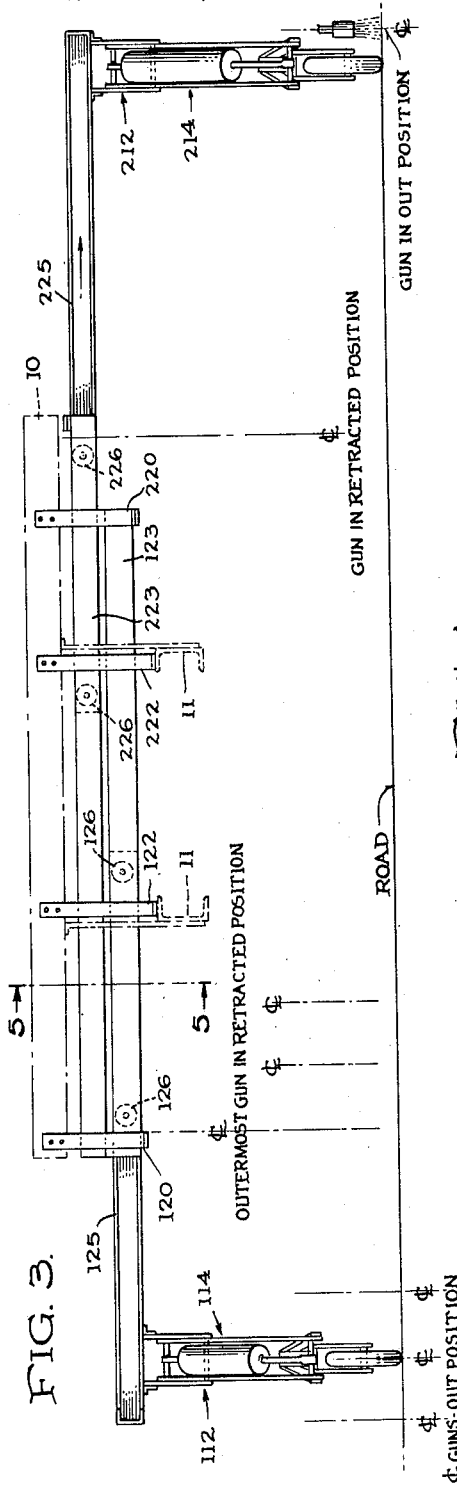
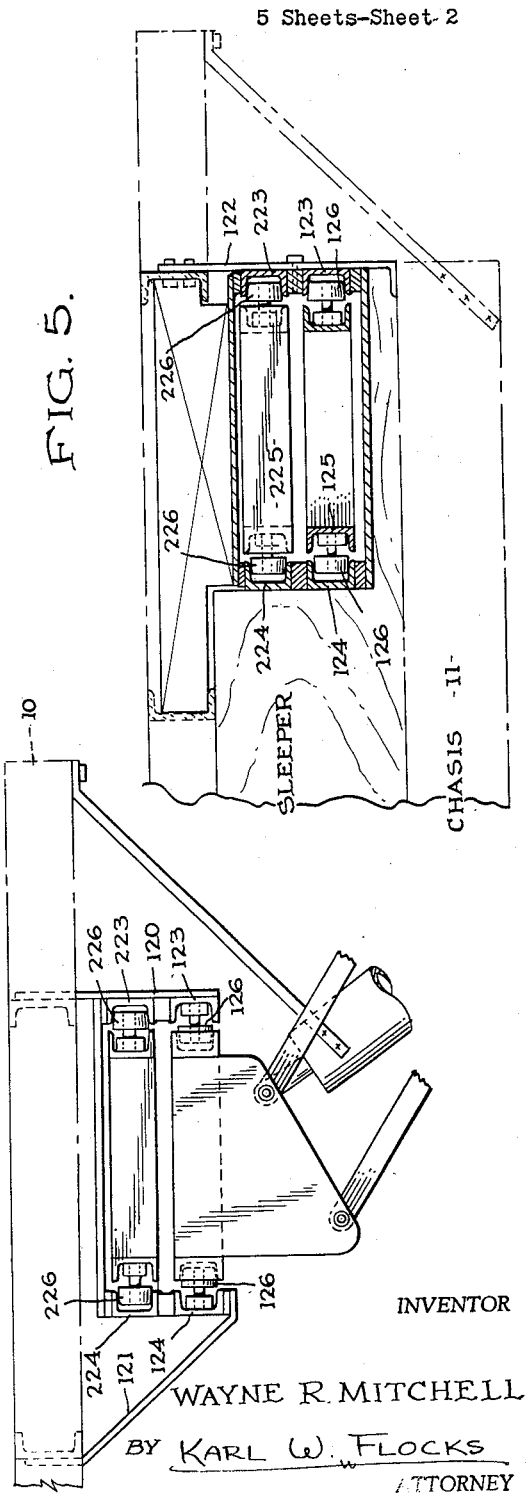
INVENTOR
WAYNE R. MITCHELL
BY KARL W. FLOCKS
ATTORNEY Dec. 22, 1964  W. R. MITCHELL  3,162,369
HYDRAULIC SYSTEM OF SPRAY GUN CARRIAGE CONTROL
Filed June 11, 1963  5 Sheets-Sheet 3
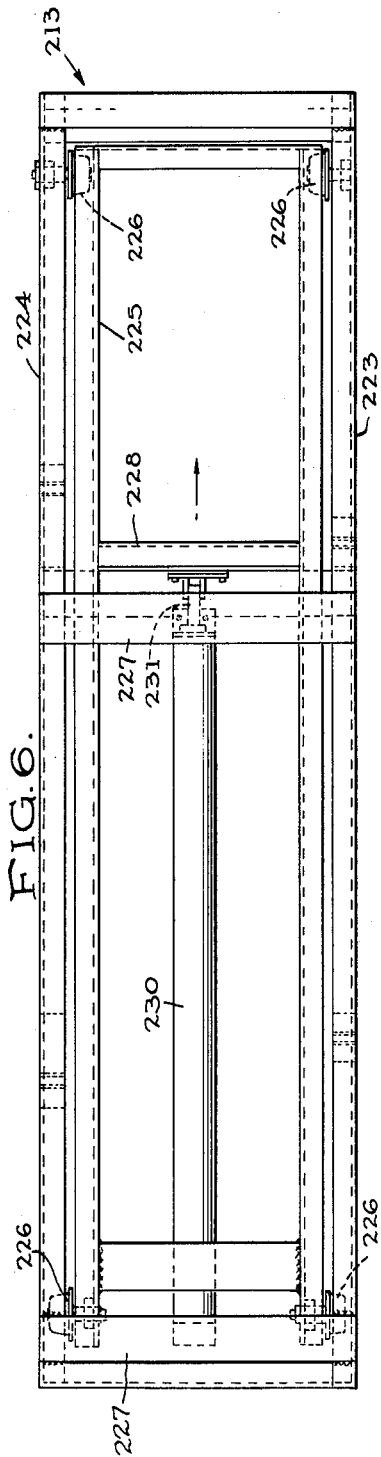
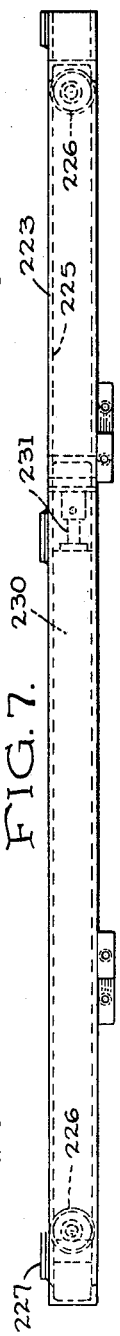
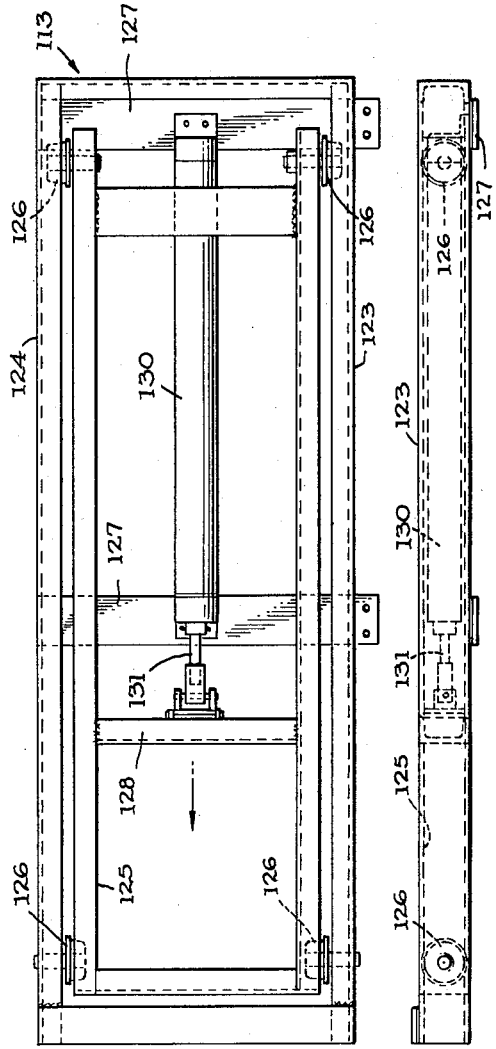
INVENTOR
WAYNE R. MITCHELL
BY Karl W. Flocks
ATTORNEY Dec. 22, 1964  W. R. MITCHELL  3,162,369
HYDRAULIC SYSTEM OF SPRAY GUN CARRIAGE CONTROL
Filed June 11, 1963  5 Sheets-Sheet 4
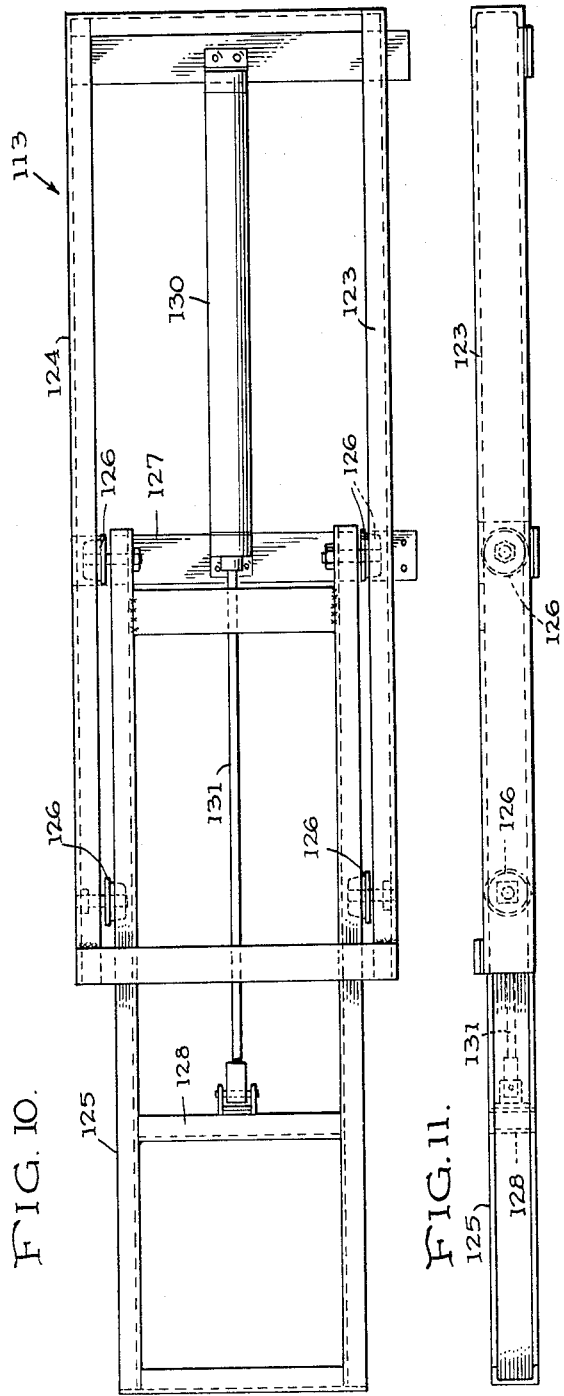
INVENTOR
WAYNE R. MITCHELL
BY  KARL W. FLOCKS
ATTORNEY Dec. 22, 1964   W. R. MITCHELL   3,162,369
HYDRAULIC SYSTEM OF SPRAY GUN CARRIAGE CONTROL
Filed June 11, 1963                         5 Sheets-Sheet 5

INVENTOR
WAYNE R. MITCHELL

BY KARL W. FLOCKS
                    ATTORNEY

United States Patent Office 3,162,369
Patented Dec. 22, 1964

3,162,369
HYDRAULIC SYSTEM OF SPRAY GUN
CARRIAGE CONTROL
Wayne R. Mitchell, Lewistown, Pa., assignor to Wald Industries, Inc., Huntingdon, Pa., a corporation of Pennsylvania
Filed June 11, 1963, Ser. No. 287,044
5 Claims. (Cl. 239—150)

The present invention relates to apparatus for controlled movement of a spray gun by hydraulic means, and particularly to the hydraulic and mechanical means to control the transverse movement of more than one spray gun carriage.

In the prior art devices the operation of spray gun carriages in a transverse direction required regulator adjustment to change the speed of extension and withdrawal of the carriage. Also in the transverse movement of more than one spray gun it was required that the carriages be moved simultaneously by entirely separate systems. In other systems the pneumatic cylinder which moved the slide carrying the spray gun was required to reach its limit switch before recycling could take place.

With the hydraulic system of the present invention the disadvantages of the prior art devices are overcome. Two slides carrying spray gun carriages on their respective ends can be operated each in an individual manner through a single hydraulic system.

Each of the slides carrying a spray gun carriage in the present invention can be locked in any intermediate position including positions differing from each other.

The apparatus of the present invention controls the speed of cylinder movement without the use of complicated bleed-off or regulator systems with the attendant adjustments necessary in such systems.

The apparatus of the present invention is especially adaptable to use with highway striping equipment and the control of such equipment in the process of the retracing action or steering of the spraying devices.

Therefore, an object of this invention is to provide a method and equipment for controlling one or more spray gun carriages used for marking highways by one or more operators on a highway striping machine.

The apparatus and method of the present invention provides a smooth positive means of moving a slide which supports a spray gun carriage. The operator is thereby allowed to control the movement of the slide, moving the slide fast or slow to suit the conditions of use.

In addition, the present invention also allows the carriage to be locked hydraulically in position when not being steered by the operator.

Accordingly, the present invention is directed to a hydraulic system which operates one or more retractable slides, each of which supports a spray gun carriage to paint stripes on highways.

These, as well as further advantages which are inherent in the invention, will become apparent from the following description, reference being had to the accompanying drawings wherein:

FIG. 3 is a rear view of the left and right side outriggers;

FIG. 4 is a fragmentary enlarged left end view of the mechanism of FIG. 3;

FIG. 5 is a sectional view taken on line 5—5 of FIG. 3;

FIG. 6 is a plan view of the right side retractable slide mechanism in a retracted position;

FIG. 7 is a rear elevation of the mechanism of FIG. 6;

FIG. 8 is a plan view of the left side retractable slide mechanism in a retracted position;

FIG. 9 is a rear elevation of the mechanism of FIG. 8;

FIG. 10 is a plan view of the left side retractable slide mechanism of FIG. 8 in an extended position;

FIG. 11 is a rear elevation of the mechanism of FIG. 10;

In order to clarify the description of the apparatus disclosed herein, all left side components are numbered in a 100 series with the right side components in a similar 200 series.

Figure 1:
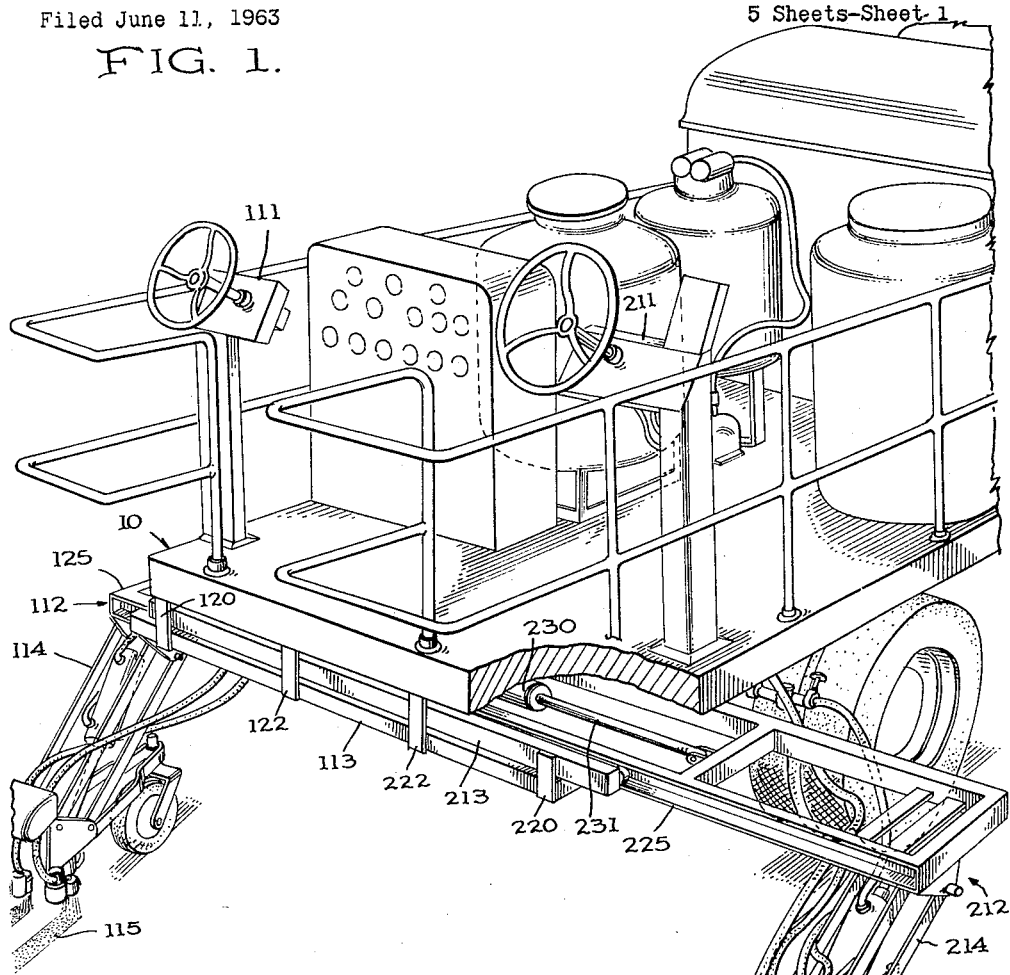
FIG. 1 is a back, right side perspective view of the part of a truck carrying the apparatus of the present invention.

FIG. 1 is a perspective view of part of a truck carrying the apparatus of the present invention. Truck platform 10 has mounted thereon the usual paint containers and compressor necessary for the paint spraying along with two control stations 111 and 211 on the left and right sides of platform 10, respectively. Below platform 10 in the rear thereof is mounted both left and right side outriggers 112 and 212, respectively, in this instance, with the left side retractable slide mechanism 113 below the right side retractable slide mechanism 213. Left and right side outriggers 112 and 212 include spray gun carriage assemblies 114 and 214, respectively, with a spray gun assembly mounted on the outer end of each of retractable slide mechanisms 113 and 213, respectively.

In the apparatus, as illustrated in FIG. 1, left side outrigger 112 is only slightly extended, thereby painting a stripe 115 close to the truck while right side outrigger 212 is further extended thereby painting the stripe 215 a greater distance from the side of the truck and determining between them the width of the lane being striped. It will be noted that the spraying apparatus is also designed to drop glass beads or other reflecting means into the paint stripe but this is present practice in the art in order to increase the reflectivity of the stripes.

Figure 2:
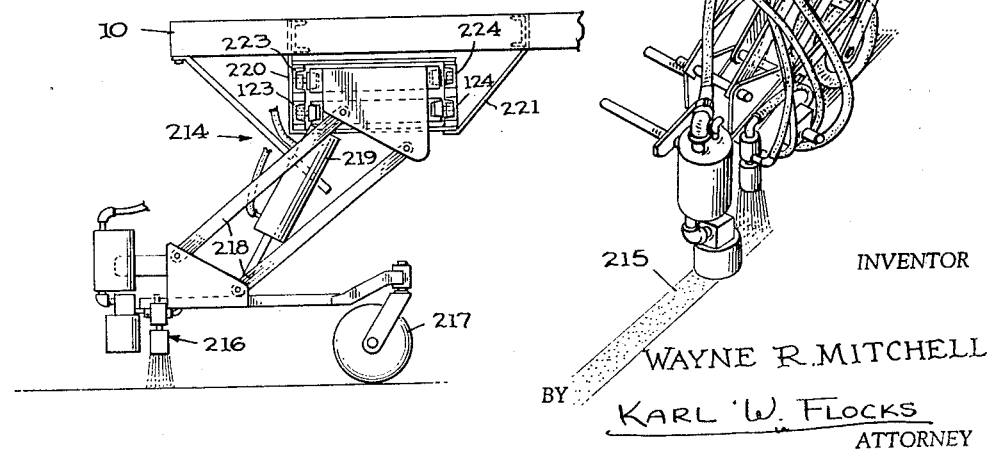
FIG. 2 is a right side elevation of the spray gun carriage assembly.

Right side spray gun carriage assembly 214 is shown in a side elevation in FIG. 2. Carriage assembly 214 in the lowered position as shown has spray gun apparatus 216 which rides on swivel mounted wheel 217 and is raised or lowered by parallel arm mechanism 218 controlled by pneumatic cylinder 219.

Rear support brackets 120, 122, 220, and 222, in cooperation with front support brackets such as bracket 221 shown in FIG. 2 connected to platform 10, support retractable slide mechanisms 113 and 213 beneath platform 10 by their outer U beam fixed tracks 223 and 224, of right side retractable slide mechanism 213, and U beam fixed tracks 123 and 124 of left side retractable slide mechanism 113.

FIG. 3 shows a rear elevation of the outriggers 112 and 212 positioned as in FIG. 1. The gun-in and gun-out position for both outriggers is designated in this figure with the designation of positions of multiple guns on the outrigger 112 for double or triple stripes at road center. This positioning of the spray guns takes place through movement of inner frames 125 and 225 of left and right side outriggers 112 and 212 respectively. Frame 125 rides on rollers 126 which move in the opposing U shaped grooves of the outer U beam fixed tracks 123 and 124 and the grooves in the parallel U beams forming part of frame 125. In a similar manner frame 225 operates in conjunction with outer U beam fixed tracks 223 and 224 on rollers 226. This is more clearly illustrated in the enlarged end view of FIG. 4 and the sectioned view of FIG. 5 illustrating details of the outriggers and retractable slide mechanisms.

Movement of frames 125 and 225 of retractable slide mechanisms 113 and 213 respectively is controlled through hydraulic cylinders 130 and 230. The ends of each of cylinders 130 and 230 are attached to fixed cross members 127 and 227, respectively. The piston rods 131 and 231 of respective cylinders 130 and 230 are attached to cross members 128 and 228 of sliding frames 125 and 225, respectively, causing said frames to move inward or outward under the action of each respective connecting piston and cylinder. FIGS. 6 and 7 illustrate plan view and back elevation, respectively, of right side retractable slide mechanism 213 in a retracted position and FIGS. 8 and 9 illustrate plan view and back elevation of left side retractable slide mechanism 113 also in a retracted position. A slightly longer right side mechanism has been found best since the truck is more easily positioned near the center stripe by a driver who always sits on the left side of the truck.

As shown in the figures, an individual hydraulic cylinder controls each of the retractable slide mechanisms. FIGS. 10 and 11 show the left retractable slide mechanism 113 in an extended position with the piston rod 131 extended and pushing sliding frame 125 into an extended position.

Figure 12:
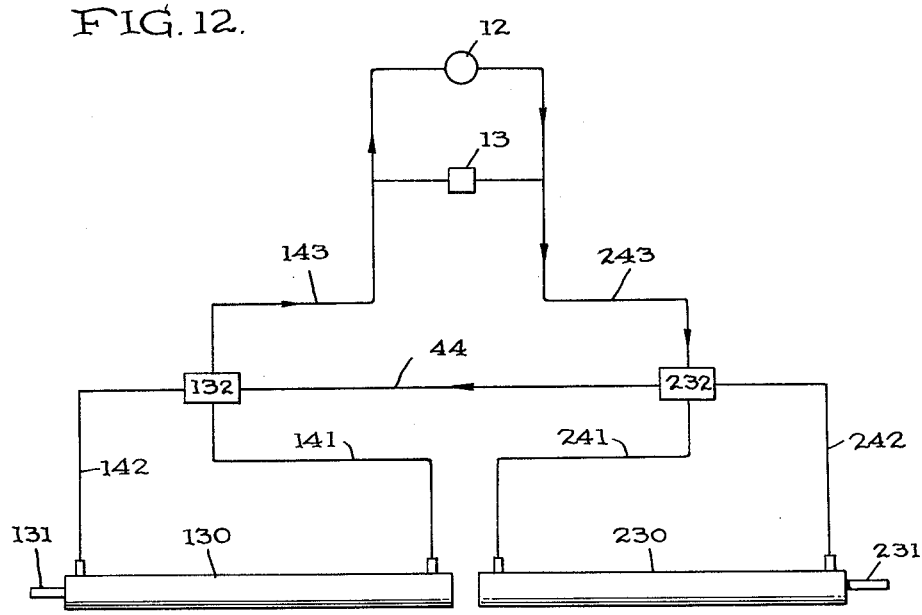
FIG. 12 is a partial schematic of a hydraulic system of the present invention for control of the retractable slide mechanisms.

The movement of piston rods 131 and 231 of hydraulic cylinders 130 and 230 may be controlled by a hydraulic system shown schematically by FIG. 12. The hydraulic system utilizes a power source 12 indicated schematically which may be the power steering unit already mounted on the truck or a hydraulic pump connected to a compressor or other power source. A relief valve 13 is regulated to relieve pressure if either of hydraulic cylinders 130 or 230 is run out or in past the end of its stroke. Connections 143 and 243 are made from the power source 12 to the four-way valves 132 and 232, respectively. Valve 132 also has connecting lines 141 and 142 to opposite ends of hydraulic cylinder 130 with line 142 connected at the end of cylinder 130 from which piston rod 131 protrudes. In a similar manner connecting lines 241 and 242 connect to opposite ends of cylinder 230. Line 44 connects valves 132 and 232 to each other.

The four-way valves 132 and 232 are located at their respective control stations 111 and 211 and are available to the operators at these controls. With the system shown in FIG. 12, each operator may only control one outrigger. The hydraulic fluid travels from power source 12 through connecting line 243, valve 232, line 44, valve 132 and connecting line 143 back to power source 12. With this path of flow through the system no movement of piston rods 131 or 231 controlling respective outriggers 112 and 212 takes place. If some of the fluid is diverted at valve 232 through line 241 to one end of hydraulic cylinder 230, the piston therein is forced to the right, causing further protrusion of piston rod 231 and extension of retractable slide mechanism 213 with the accompanying movement of spray gun carriage assembly 214 out from the side of the truck. On the other hand, diversion of a portion of the fluid through valve 232 to line 242 will force fluid into the opposite side of hydraulic cylinder 230 and force the piston therein to the left, causing withdrawal of piston rod 231 into cylinder 230 with accompanying withdrawal of retractable slide mechanism 213 under truck platform 10 and the movement of spray gun carriage assembly 214 in toward the truck. Since the amount of fluid diverted from main flow circuit of lines 243, 44 and 143 can be controlled and the speed of flow into either lines 241 or 242 to their respective entrances to hydraulic cylinder 230 is also controllable by the operator, both the transverse distance and speed of travel transversely of the spray gun carriage assembly 214 can be controlled precisely by the operator. In a similar manner the operator at valve 132 can control flow to lines 142 and 141 with accompanying movement of retractable slide mechanism 113 and spray gun carriage assembly 114. In all diversions of fluid into a line and into a cylinder, an equal amount of fluid is allowed to escape from the opposite side of the cylinder through the appropriate four-way valve.

Figure 13:
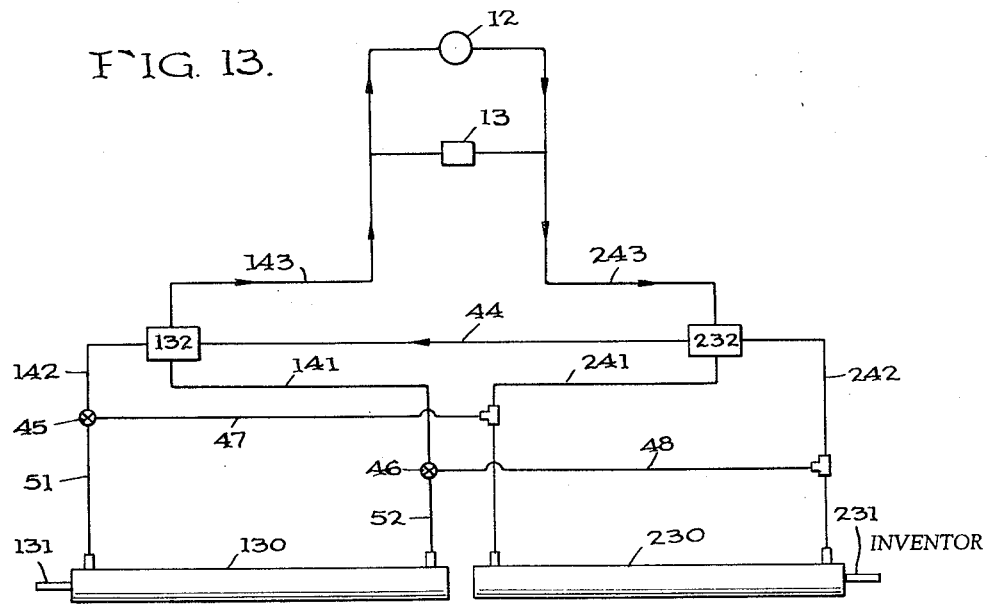
FIG. 13 is a partial schematic of a modified form of the hydraulic system of FIG. 12.

In the modified version of the hydraulic system illustrated in FIG. 13, selector valves 45 and 46 are placed in lines 142, and 141, respectively. A line 47 from selector valve 45 connects valve 46 to line 241. A similar line 48 from selector valve 46 connects valve 46 to line 242. The controls of selector valves 45 and 46 are both located on a single control panel at control station 211. Selector valves 45 and 46 may, in the alternative, be at control station 111 and be located in lines 242 and 241, respectively, with connections to lines 141 and 142, respectively. In the case as illustrated with lines 47 and 48 blocked to the passage of fluid by selector valves 45 and 46, respectively, the operator at control station 211 controls the operation of the right side outrigger 212 and sets the spacing between both spray gun carriage assemblies 114 and 214 to determine the width of the line to be striped. After the setting is made, selector valves 45 and 46 are manipulated to shut off fluid flow between valve 132 and hydraulic cylinder 130 through lines 142 and 141 while allowing through passage of fluid from valve 232 through line 241, line 47, selector valve 45, and line segment 51 to one end of the hydraulic cylinder 130 or through passage of fluid from valve 232 through line 242, line 48, selector valve 46, and line segment 52 to the opposite end of hydraulic cylinder 130. In this manner an inside end and an outside end of each cylinder are fluidly connected with each other. The spray gun carriage assemblies are thus locked hydraulically with each other and can both be moved by one operator at one control station while automatically retaining their relative positions to each other.

The modified form of the hydraulic system incorporated into the present invention greatly facilitates the striping of lanes of a specific width with all spray guns controlled by one operator.

It will be obvious to those skilled in the art that various changes may be made without departing from the spirit of the invention and therefore the invention is not limited to what is shown in the drawings and described in the specification but only as indicated in the appended claims.

What is claimed is:

1. Hydraulic road striping mechanism comprising
a first retractable means;
a second retractable means mounted so as to extend in a direction opposite to said first retractable means;
spraying means mounted on the outer end of each of said retractable means;
an hydraulic system operatively attached to said first and second retractable means including
a first hydraulic operating means attached to said first retractable means for controlling the transverse movement of said first retractable means,
a second hydraulic operating means attached to said second retractable means for controlling the transverse movement of said second retractable means,
a first control means hydraulically connected to opposite ends of said first hydraulic operating means,
a second control means hydraulically connected to opposite ends of said second hydraulic operating means,
and a power source connected to said first control means and said second control means;
said first and second hydraulic operating means each including
a first end having a piston rod extending therefrom and a second end on the opposite end of said hydraulic operating means from which said piston rod protrudes;
and a first valve means operatively connected between said first control means and said first end of said first hydraulic operating means and hydraulically connected to said second end of said second hydraulic operating means;

and a second valve means operatively connected between said first control means and said second end of said first hydraulic operating means and hydraulically connected to said first end of said second hydraulic operating means.

2. Hydraulic road striping mechanism comprising
a first retractable means;
a second retractable means mounted so as to extend in a direction opposite to said first retractable means;
spraying means mounted on the outer end of each of said retractable means;
an hydraulic system operatively attached to said first and second retractable means including
a first hydraulic operating means attached to said first retractable means for controlling the transverse movement of said first retractable means,
a second hydraulic operating means attached to said second retractable means for controlling the transverse movement of said second retractable means,
a first control means hydraulically connected to opposite ends of said first hydraulic operating means,
a second control means hydraulically connected to opposite ends of said second hydraulic operating means,
and a power source connected to said first control means and said second control means;
said first retractable means and said second retractable means each including
a fixed frame,
a movable frame in said fixed frame,
and roller means operatively connecting said movable frame in said fixed frame and allowing movement in relation thereto;
and said first hydraulic operating means and said second hydraulic operating means each further including
a cylinder,
and a piston rod moving with portions within said cylinder;
said cylinder of said first hydraulic operating means attached to said fixed frame of said first retractable means, and said cylinder of said second hydraulic operating means attached to said fixed frame of said second retractable means;
said piston rod of said first hydraulic operating means attached to said movable frame of said first retractable means and said piston rod of said second hydraulic operating means attached to said movable frame of said second retractable means.

3. The hydraulic road striping mechanism of claim 1 wherein said second control means is hydraulically connected to said first control means.

4. The hydraulic road striping mechanism of claim 3 wherein said first control means and said second control means are each a four-way valve means.

5. The hydraulic road striping mechanism of claim 1 further characterized by
said first retractable means and said second retractable means each including
a fixed frame,
a movable frame in said fixed frame,
and roller means operatively connecting said movable frame in said fixed frame and allowing movement in relation thereto;
and said first hydraulic operating means and said second hydraulic operating means each further including
a cylinder;
said cylinder of said first hydraulic operating means attached to said fixed frame of said first retractable means and said cylinder of said second hydraulic operating means attached to said fixed frame of said second retractable means;
said piston rod of said first hydraulic operating means attached to said movable frame of said first retractable means and said piston rod of said second hydraulic operating means attached to said movable frame of said second retractable means.

References Cited by the Examiner
UNITED STATES PATENTS

| | | | |
|---|---|---|---|
| 954,241 | 4/10 | Affelder et al. | 239—187 |
| 998,556 | 7/11 | Seaver et al. | 239—187 |
| 1,928,551 | 9/33 | Ball | 239—150 |
| 2,518,952 | 8/50 | Sohmer | 239—165 |

FRED E. ENGELTHALER, *Primary Examiner.*
EVERETT W. KIRBY, *Examiner.*